United States Patent [19]

Stahl et al.

[11] Patent Number: 4,491,729
[45] Date of Patent: Jan. 1, 1985

[54] RADIATION RECEIVER AND METHOD OF MANUFACTURING SUCH A RECEIVER

[75] Inventors: Konrad Stahl; Josef Theiss, both of Ulm; Jochen Weber, Neu-Ulm, all of Fed. Rep. of Germany

[73] Assignee: Licentia Patent-Verwaltungs-GmbH, Fed. Rep. of Germany

[21] Appl. No.: 420,391

[22] Filed: Sep. 20, 1982

[30] Foreign Application Priority Data

Nov. 4, 1981 [DE] Fed. Rep. of Germany ....... 3143658

[51] Int. Cl.³ ................................................ G01J 5/04
[52] U.S. Cl. .................................. 250/336.1; 250/352; 250/338
[58] Field of Search ...................... 250/352, 336.1, 372, 250/338 R; 62/514 R; 29/841, 588

[56] References Cited

U.S. PATENT DOCUMENTS

| | | | |
|---|---|---|---|
| 3,210,171 | 10/1965 | MacDonald | 65/153 X |
| 3,618,203 | 11/1971 | Pryor | 29/588 |
| 3,719,990 | 3/1973 | Long et al. | 29/841 |
| 4,005,288 | 1/1977 | Robillard | 250/239 |
| 4,059,764 | 11/1977 | Belasco et al. | 250/352 |

Primary Examiner—Janice A. Howell
Assistant Examiner—Constantine Hannaher
Attorney, Agent, or Firm—McGlew and Tuttle

[57] ABSTRACT

A radiation receiver comprises an inner cylindrical part of insulating material having a closed end and an opposite end with a radially extending annular flange. At least one sensor is mounted on the inner part preferably on the closed end thereof and on its exterior. At least one conductor track lead provided on the inner part extending from the sensor on the exterior wall of the inner part and along the exterior of the flange. An outer cylindrical part having a closed end and an opposite open end has a rim surrounding the end which is engaged on the flange over the track at a location to leave an outer extending portion of the track extending outwardly from the exterior of said outer cylindrical part and along said flange. A glass solder seam seals the outer cylindrical part to the flange of the inner cylindrical part around the rim. In accordance with the method of the invention it is carried out using the inner and outer cylindrical parts by arranging a sensor on the exterior surface of the inner part, applying conductive leads on the inner part extending from the sensor along the exterior wall of the inner part and outwardly along the flange thereof. Thereafter the outer part is applied over the inner part so that the rim engages over the flange leaving an exterior track extending outwardly therefrom along the flange. Thereafter, a glass solder is applied around the rim and over the track and the flange of the inner part.

14 Claims, 3 Drawing Figures

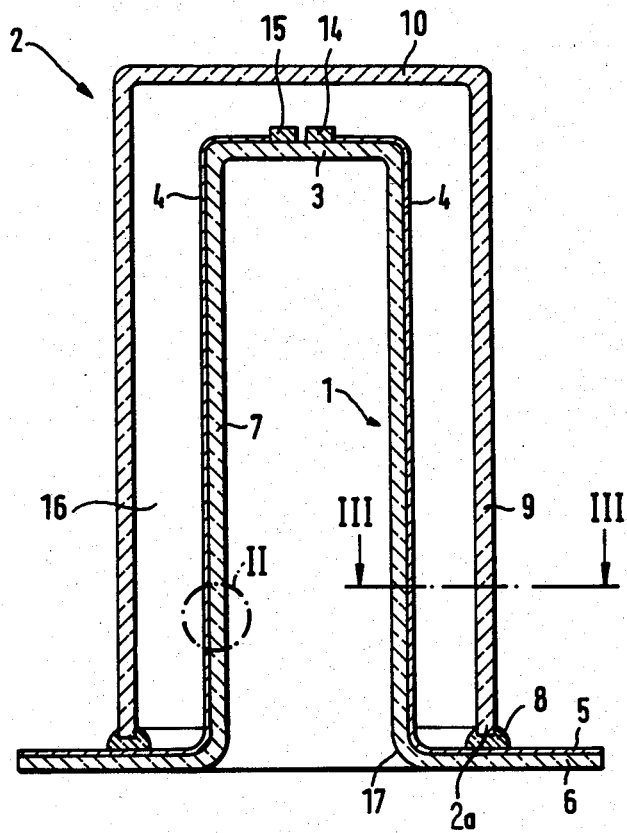
FIG.1
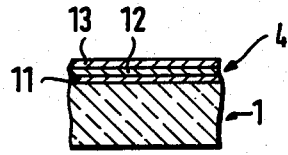
FIG.2
FIG.3

RADIATION RECEIVER AND METHOD OF MANUFACTURING SUCH A RECEIVER

FIELD AND BACKGROUND OF THE INVENTION

This invention relates in general to the construction of sensor elements and in particular to a new and useful radiation detector and to a method of making such a detector.

Radiation detectors comprising a plurality of sensor or detector elements are known. Such detectors are responsive, for example, to heat radiation or ultraviolet radiation. Detectors of this multi-sensor type are employed to produce visible images. It is known that such detectors must be operated at very low temperatures, if a high sensitivity is required. Detector elements of prior art radiation receivers of this kind may be accommodated in a vacuum space which is designed as a Dewar vessel at the same time. In the usual design, such a radiation receiver comprises a Dewar vessel formed by cup-shaped parts, with the Dewar elements being arranged on the outside of the bottom portion of the inner part. An evaporation cooler or a similar cooling element is inserted in the cavity of the inner part.

The quality of an image increases with the amount of separation spacing of the sensor elements. This, however, involves the necessity of providing an equally large number of electrical leads connecting the sensor elements to the outside of the Dewar vessel. In a prior art design, very fine metal wires are used for connecting the sensor elements, which wires are led out from the Dewar vessel in the zone where the two cup-shaped parts of the vessel are fused to each other, and serve as outer contact elements.

Since the size of such radiation receivers is necessarily limited, an increasing number of electrical leads makes it increasingly difficult to obtain a satisfactory hermetic sealing of the Dewar vessel, particularly if the radiation receiver is also exposed to high mechanical and thermal loads.

SUMMARY OF THE INVENTION

The present invention is directed to an improvement of a radiation receiver permitting in a simple way to provide a large number of electrical leads even in small-size receivers and ensuring at the same time a reliable permanent sealing of the Dewar vessel.

In accordance with the invention, a radiation detector includes an inner part insulating material which has a closed end and an opposite end with a radially extending flange extending around the opening. At least one sensor is placed on the inner part preferably adjacent the closed end on its exterior and at least one conductor track lead extends from the sensor along the exterior wall of the inner part and along the flange thereof. An outer cylindrical part having a closed end and an opposite open end with a rim surrounding the opening of the end is engaged over the inner part and the rim is engaged on the flange over the track, at a location to leave an outer extending portion of the track extending outwardly along the flange from the outer part. A glass solder seam seals the outer part of the end part and extends around the rim and over the flange.

This arrangement makes possible with simple means to provide a very large number of leads and thus to construct radiation receivers comprising a very high number of sensor elements. More than 200 leads may easily be provided with the inventive design, while ensuring a vacuum-tight contacting of the sensor elements. The inventive glass solder seal withstands high impact loads and temperature variations, without affecting the hermetical closure. Another advantage of the invention is that the resistance of the individual sensor elements may be balanced subsequently by forming portions of higher electrical resistance in the respective laminated leads, for example by sectionally reducing the thickness or width thereof.

Accordingly, it is an object of the invention to provide an improved radiation detector which includes an inner part having an opened end with a flange surrounding the open end having a sensor thereon with a track of conductor material extending from the sensor along the exterior surface of the inner part and outwardly along the flange and further including an outer part engaged over the inner part and having a rim engaging on the flange which is sealed to the flange by a sealing seam of glass solder.

A further object of the invention is to provide an improved method of forming a radiation detector which comprises using a sensor on the inner member preferably adjacent its closed end and extending a conductor track from the sensor over the surface of the inner member and outwardly along a flange thereof at its opposite open end, and thereafter positioning an outer cylindrical member over the inner member so that its rim is engaged on the flange and thereafter sealing the rim to the flange by applying a glass solder.

A further object of the invention is to provide a radiation detector which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a transverse sectional view of radiation detector constructed in accordance with the invention;

FIG. 2 is an enlarged partial detail of a portion of a flange of the inner member shown in FIG. 1 indicating the multilayer construction of the conductor track; and FIG. 3 is a partial section taken along the line A—B of FIG. 1.

DESCRIPTION OF THE PREFERRED EMBODIMENTS

Referring to the drawings in particular the invention embodied therein comprises a radiation receiver made up of an inner cylindrical part 1 of insulating material which has a closed end forming a bottom 3 and an opposited open end with a radially extending annular flange 6 extending around the opening. At least one sensor and in the embodiment shown, two sensor elements 14 and 15 are mounted on the inner part adjacent the bottom or directly on the bottom 3. At least one conductive track lead in the embodiment shown, two leads 4, 4 are defined on the inner part and extend from a respective sensor 14 or 15 to and along the exterior of the inner part 1 and radially outwardly along the flange 6. Construction includes an outer cylindrical part 2 having a closed end forming a bottom 10 and an opposite open end having a surrounding rim 2a around the open end which is engaged on the flange 6 and over the tracks 4 and 5 in a location leaving an outer extension of the tracks 4 and 5 extending radially outwardly from the exterior of the outer part 2. Glass solder 8 is applied between the rim 2a and the lower end of the outer part 2 and the flange 6 of the inner part 1.

The radiation seal comprises two cup-shaped or cylindrical parts of which an inner part 1 is made of an insulating substance, such as glass or a ceramic material and in the shown embodiment, an outer part 2 which is also made of glass. Each of the two parts has a bottom portion 3,10. The bottom 10 of the outer part must be permeable to the radiation to be detected, at least in the area facing sensor elements 14 and 15. The cylindrical wall 9 of outer part 2 may be entirely or partly metallic. In such an instance, however, a satisfactory insulation must be provided in the zone of the hermetically sealing seam 8.

The inner part of 1 including bottom 3 and a cylindrical wall 7 is provided at its open end with a substantially radially outwardly projecting annular flange 6 with, preferably a rounded transition portion 17 being formed between flange 6 and cylindrical wall 7. For reasons of clarity, only two sensors 14 and 15 of a possible plurality of sensor elements are shown, which are provided in the enclosed Dewar space. To contact these elements, laminated conductor tracks 4 are provided on the outer surface of inner part 1. The conductor tracks extend parallel to the longitudinal axis of cylindrical part 1 and then along the surface of annular flange 6. The portions extending outside Dewar space 16, are indicated at 5.

Outer part 2 is secured to inner part 1 by soldering the rim of cylindrical wall 9 of outer part 2 to the surface of annular flange 6 carrying the radially extending portions of conductor tracks 5, by means of a glass solder seam 8.

Glass solder 8 is preferably a vitreous substance which, being initially in a substantially amorphous state, permits the soldering operation, and is then caused to assume a crystalline structure under high temperatures sustained over a longer period of time. Such glass solders are termed recrystallized glass solders. The use of such recrystallized glass solders ensures in a simple way the needed tightness between outer part 2 and inner part 1, and a safely hermetic adhesion to metals, namely to the conductor tracks. Conductor track portions 4 and 5 are formed by continuous strips.

Preferably, the conductor tracks consist of a plurality of superposed layers of different metals. According to a preferred development of the invention, an inner layer 11 directly applied to the glass of inner part 1 is a chromium layer.

FIG. 2 is an enlarged cross-sectional view showing a preferred sequence of layers. In this design, the conductor track comprises three superposed layers 11,12 and 13. Part 1 is made of glass. Applied thereto first, is the chromium layer 11 having a thickness of about 0.04 microns. Thereon, a copper layer 12 is provided having a thickness of 0.5 microns. The top layer is a layer 13 of precious metal particularly gold, in a thickness of about 0.5 to 10 microns, depending on the required resistance. By proper thermal treatment, diffusion zones are formed between the individual metallic layers. These multi-layer conductor tracks extend continuously from their contact with the respective sensor element 14 or 15 to their outer contacting portions 5.

FIG. 3 shows how conductor track portions 5 divert fan-like toward the outer end of the annular flange 6, thus permitting a better contacting. On the outer surface of cylindrical wall 7 of inner part 1, the conductor tracks extend as narrow metal strips 4 which are insulated relative to each other.

Advantageously, the conductor tracks are produced on the outer surface of inner part 1 by initially applying the superposed structure of layers over the entire surface area and then forming separate contacting strips in the desired pattern.

According to a further development of the invention, the resistance balancing or adjustment may be effected by reducing the cross-sectional area of the respective conductor tracks 4, particularly of their portion extending on the cylindrical wall 7 of the inner part 1, thus increasing the resistance and matching it to the electrical resistance of the associated sensor elements 14 or 15.

In accordance with the inventive method a radiation receiver is formed using an inner part with a closed end and an opposite open end with a surrounding flange and an outer cylindrical part having a closed end and wherein at least a part is made of an insulating material such as glass which comprises affixing a sensor to the exterior surface of the inner part and also affixing a conductor track from the sensor out along the surface of the inner part and radially outwardly on the flange thereof and thereafter applying the outer part over the inner part so that the rim surrounding the open end thereof engages on the flange of the inner part connecting the outer part to the flange of the inner part by applying a partly crystallized glass solder seam between the rim of the outer part and the flange of the inner part. Advantageously the glass solder is applied in a predetermined amount in an area provided for the seam and it is heated at least in the zone of the solder deposit until the glass solder is plasticized and the inner part becomes joined to the outer part and thereafter recrystallization of the glass solder is brought about in a tempering process. Advantageously, the seam is is applied in the form of a glass solder ring which is shaped in advance, for example by pressing or sintering.

The conductor tracks are advantageously produced by large surface deposition of the metals of the tracks on the surface of the inner part 1 and subsequent removal of the layers in the zones required for insulation. The conductor track layers 4 and 5 may advantageously be formed by depositing them by a sputtering or vaporization process.

While specific embodiments of the invention have been shown and described in detail to illustrate the application of the principles of the invention, it will be understood that the invention may be embodied otherwise without departing from such principles.

What is claimed is:

1. A radiation receiver, comprising an inner cylindrical part of insulating material having a closed end and an opposite open end with a radially extending annular flange, at least one sensor on said inner part adjacent said closed end, at least one conductor track lead on said inner part extending from said sensor to and along said flange, and an outer cylindrical part having a closed end and an opposite open end having a surrounding rim adjacent said open end which is engaged on said flange and over said track lead leaving an outer extension of said track lead extending outwardly on said flange from said outer part, and a glass solder seam sealing said outer part with said inner part around the rim of said outer part and the flange of said inner part.

2. A radiation receiver according to claim 1, wherein said seam comprises at least partly recrystallized glass solder.

3. A radiation receiver according to claim 1, wherein the width of said conductor track lead at the location on said flange becomes larger toward the outer circumference of said flange.

4. A radiation receiver according to claim 1, wherein there are a plurality of sensors on said inner member, said at least one conductor track lead comprising a conductor track lead for each sensor and each having a plurality of metal layers.

5. A radiation receiver according to claim 1, wherein said at least one conductor track lead comprises a plurality of layers deposited directly on the exterior surface of said inner part, the innermost one of said layers comprising a chromium layer.

6. A radiation receiver according to claim 5, wherein said plurality of layers includes an intermediate layer on said chromium layer comprising a copper or titanium.

7. A radiation receiver according to claim 1, wherein said at least one conductor track lead comprises a plurality of metal layers including an outer layer of a precious metal, particularly gold.

8. A radiation receiver according to claim 1, wherein said at least one conductor track layer is a vapor deposited layer.

9. A radiation receiver according to claim 1, wherein said inner part comprises a glass material.

10. A radiation receiver according to claim 1, wherein said inner and outer parts are made of a glass material, said outer part being light transmissive at least in the vicinity of said sensor.

11. A method of forming a radiation receiver using an inner part of insulating material in cylindrical form having a closed end and an opposite open end with a surrounding flange and an outer cylindrical part having an open end with a rim surrounding the open end which comprises arranging the sensor on the surface of the inner part adjacent the closed end, applying conductive material lead strips onto the surface of said inner part extending from said sensor along the surface of said inner part and outwardly along the surface of said flange, applying the outer part over the inner part so that the rim engages over the flange at a location leaving an exterior track lead portion extending outwardly of said outer part along said flange, thereafter applying a glass solder between the rim of the outer part and the flange of the inner part to seal these parts together.

12. A method according to claim 11, wherein the glass solder is initially deposited in a predetermined amount in an area provided for a seam between the outer and inner parts, then heating the glass solder until it becomes plasticized and the inner part becomes joined to the outer part, then bringing about the recrystallization of the glass solder by a tempering process.

13. A method according to claim 11, wherein glass solder is formed as a seam ring in advance by pressing or sintering and the two parts are joined to the seal ring.

14. A method according to claim 11, wherein the metal track lead is formed by a large surface deposition on the inner part and thereafter a portion of the formation is removed in areas in which insulation is necessary.

* * * * *